//

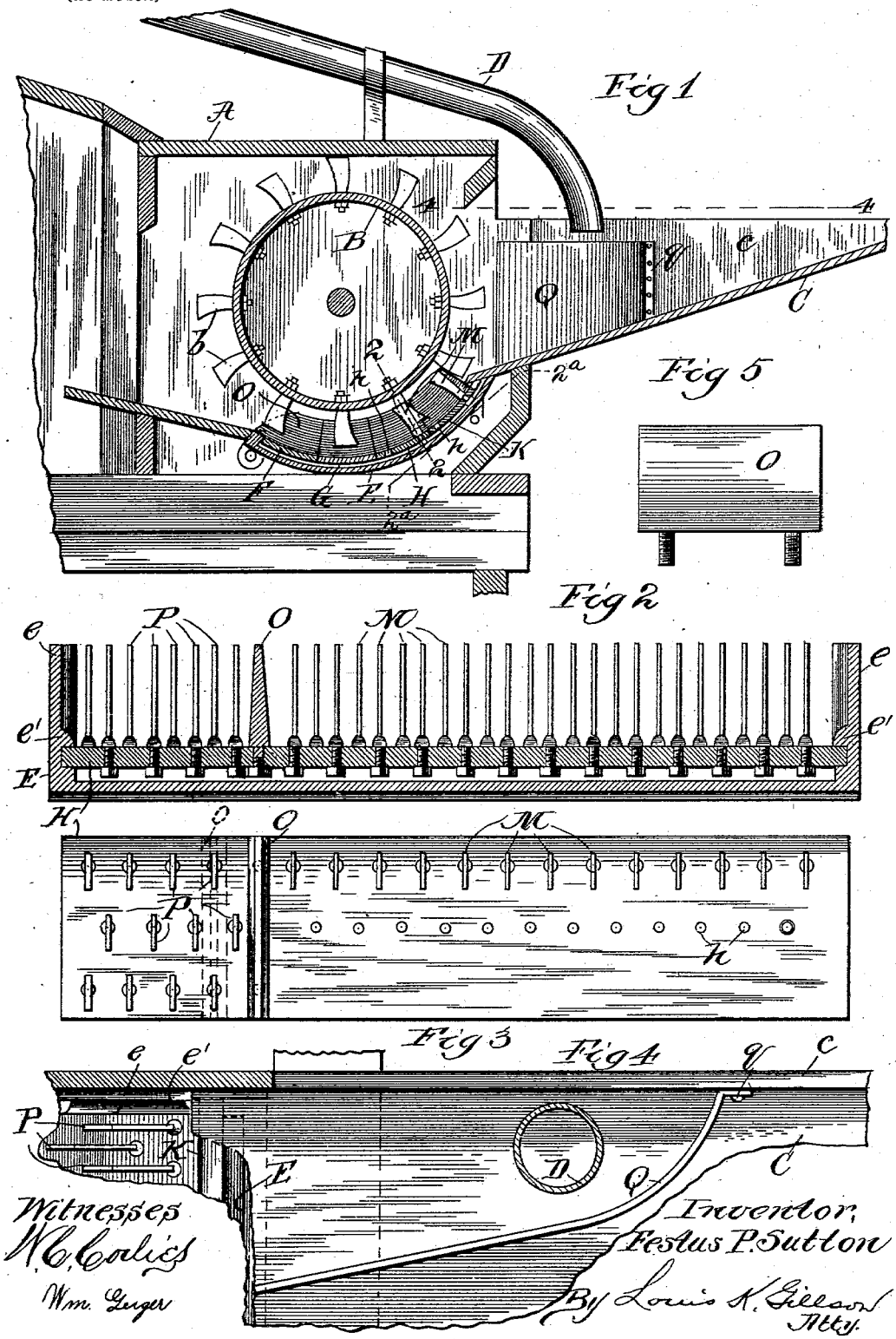

UNITED STATES PATENT OFFICE.

FESTUS P. SUTTON, OF LOWELL, INDIANA.

CLOVER-HULLING ATTACHMENT FOR THRESHING-MACHINES.

SPECIFICATION forming part of Letters Patent No. 633,923, dated September 26, 1899.

Application filed May 2, 1898. Serial No. 679,471. (No model.)

*To all whom it may concern:*

Be it known that I, FESTUS P. SUTTON, a citizen of the United States, and a resident of Lowell, county of Lake, and State of Indiana, have invented certain new and useful Improvements in Clover-Hulling Attachments for Threshing-Machines, of which the following is a specification, and which are fully illustrated in the accompanying drawings, forming a part thereof.

The object of the invention is to provide means to adapt an ordinary grain-threshing machine for the hulling of clover; and it consists in a novel construction of the concave for coöperating with the toothed cylinder, whereby the two operations of threshing for removing the heads from the straw and of hulling or separating out the seed from the heads are performed by one continuous operation of the threshing-cylinder, the particular construction by which this result is secured being fully hereinafter described.

In the accompanying drawings, Figure 1 is a detail section of a threshing-machine, the view being vertical and transverse to the threshing-cylinder and its case. Fig. 2 is a detail section on the line 2 2 of Fig. 1, the parts being shown as on the base-line 2ª 2ª. Fig. 3 is a plan view of one of the plates forming the concave. Fig. 4 is a detail plan, partly in section and partly broken away, taken on the line 4 4 of Fig. 1; and Fig. 5 is a detail of an element of one of the plates of the concave.

The cylinder-case of an ordinary threshing-machine is shown at A, and the toothed cylinder of the machine at B. The feed-table is represented at C, and the tailings-spout for returning the tailings to the feed-table at D. The casing for the concave is shown at E and is provided with end pieces or walls $e$ $e$, each having a rib along its inner surface and near its lower edge, as shown at $e'$ $e'$. All of these parts are common in grain-threshing machines either in the form shown or in substantially equivalent forms.

My invention resides in the novel form of the plates F, G, H, and K making up the toothed concave which coöperates with the toothed cylinder B, these several plates being adapted to enter the ways formed between the ribs $e'$ $e'$ and the bottom of the case E, so as to form a lining for this case.

The plates F, G, H, and K are provided with apertures, as shown at $h$, for receiving the teeth M P, these apertures being as numerous as desired and the teeth being attached in any desired manner—as, for example, by means of screw-threaded shanks entering the apertures. Across one side of each section, near one of its ends, as shown approximately one-fourth of the length of the entire plate from its end, I place a rib or partition O, which should be of substantially the same height as the teeth M P, the ribs O of the several sections being correspondingly placed, so that when the sections or plates are adjusted to the casing E a continuous rib or partition is formed across the concave.

The teeth P, located upon that side of the rib O which constitutes the shorter portion of the section, are much more numerous than the teeth M upon the longer portion of the section; but in each case they are so placed that the teeth $h$ of the cylinder may pass between them.

A hopper for coöperating with the shorter portion of the concave is formed by means of a plate Q, which may be secured, as shown at $q$, to one of the side walls, as $c$, of the feed-table C; the plate Q extending obliquely across the feed-table and terminating at the throat of the threshing-chamber and opposite the end of the rib O. The mouth of the tailings-spout is located directly above this hopper.

The rib-pieces O are provided with stud-bolts or shanks, the same as the shanks of the teeth B, as shown, whereby they are attached to the plates H, and hence the rib may be adjusted longitudinally as to the concave to adapt the machine to the character of the material being operated upon, as indicated by dotted lines in Fig. 3 of the drawings.

When a threshing-machine is thus equipped for the hulling of clover, the straw is fed into the longer end of the concave and there threshed—that is to say, the heads are broken from the stems. The teeth M are numerous enough only to accomplish this result and should not be numerous enough to cause the stems to be broken into small fragments. To this end I prefer to place the teeth M only in the first two sections of the concave and preferably only one row in each section, though the number of teeth employed will depend upon the condition of the straw at the time of the operation. The heads being broken from the stems will fall through the sieves and be separated out from the straw as tailings exactly as the broken and unthreshed heads of grain are separated out in the ordinary operation of the threshing-machine. These tailings, consisting of the clover-heads, are returned by means of the elevating mechanism always present in a threshing-machine and which I have not deemed it necessary to show to and through the spout D and delivered to the hopper, already described, and thence to the shorter portion of the concave. The rib O prevents the intermingling of the straw fed to the machine for threshing and the heads fed to the machine from the tailings-spout. This rib is set sufficiently near the end of the concave so as to cause the machine to be considerably choked by the clover-heads, and the more effectually this choking is accomplished without unduly increasing the power necessary to drive the machine the more effectually and efficiently is the hulling operation performed.

I prefer to use smooth teeth both in the concave and the threshing-cylinder, so that the seed will be broken as little as possible, and I depend upon the rubbing or chafing of the seed-pods against each other for the purpose of rubbing out the seed rather than upon the actual abrasion of the pod by the teeth, the action being as nearly as possible the same as that of rubbing the clover-heads between the hands.

The adjustability of the rib permits the adaptation of the machine to the character of the material. If the material has an unusual excess of straw, it is necessary to the proper operation of the device that the threshing end of the cylinder and concave be lengthened and the hulling end contracted in order that there will not be a hulling action in the threshing operation, while in the hulling operation there will be the necessary crowding to insure the essential rubbing action. If, on the other hand, the material has an unusual development of the heads and a comparatively scanty development of the straw, it is important that the rib be so shifted as to enlarge the hulling end of the cylinder and concave in order that it may have ample capacity to accommodate the unusually large volume of material which must be treated.

By the construction shown I am able at very slight cost to adapt any of the threshing-machines of the type now commonly used for the hulling of clover, thereby obviating the necessity of the employment of an expensive machine for this particular service.

I claim as my invention—

1. As an article of manufacture, a concave for threshing-machines, having a transverse rib longitudinally adjustable thereupon, and being provided with teeth on each side of the rib.

2. In a clover-huller, the combination with a toothed rotatable drum, of a toothed concave for coöperating with the drum, and having a circumferentially-disposed dividing-rib longitudinally adjustable as to the concave, the teeth in one section of the concave being so disposed as to break the straw to loosen the heads therefrom, the teeth in the other section being so disposed as to effect the hulling of the seed; means for separating the loosened heads from the straw and means for returning the heads to the hulling end of the concave.

FESTUS P. SUTTON.

Witnesses:
GEO. W. LAWRENCE, Jr.,
JOHN ANDERSON.